(12) United States Patent
Steck et al.

(10) Patent No.: US 8,776,324 B2
(45) Date of Patent: Jul. 15, 2014

(54) ATTACHING STRUCTURE FOR AN ATTACHABLE ARRANGEMENT

(75) Inventors: Jeremy A. Steck, Pittsburgh, PA (US);
Grant M. Myers, Pittsburgh, PA (US);
Justin J. Adleff, Pittsburgh, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 200 days.

(21) Appl. No.: 13/008,116

(22) Filed: Jan. 18, 2011

(65) Prior Publication Data

US 2011/0173781 A1 Jul. 21, 2011

Related U.S. Application Data

(60) Provisional application No. 61/296,221, filed on Jan. 19, 2010.

(51) Int. Cl.
*A44B 11/02* (2006.01)
*A44B 11/10* (2006.01)
*B60R 22/00* (2006.01)

(52) U.S. Cl.
CPC *A44B 11/10* (2013.01); *B60R 22/00* (2013.01)
USPC ............................................. 24/171; 24/196

(58) Field of Classification Search
CPC ..... A44B 11/10; A62B 35/00; A62B 35/0025
USPC ....... 24/198, 200, 171, 194, 196, 163 R, 164, 24/168, 169, 170
See application file for complete search history.

(56) References Cited

U.S. PATENT DOCUMENTS

| 2,088,820 | A | * | 8/1937 | Tompkins | 24/194 |
| 4,069,554 | A | | 1/1978 | Minolla et al. | |
| 4,551,889 | A | * | 11/1985 | Narayan et al. | 24/196 |
| 4,608,735 | A | * | 9/1986 | Kasai | 24/196 |
| 4,610,055 | A | * | 9/1986 | Knox | 24/68 CD |
| 4,712,513 | A | | 12/1987 | Huppertsberg | |
| 4,791,709 | A | * | 12/1988 | Fildan | 24/171 |
| 4,903,378 | A | * | 2/1990 | Kasai | 24/196 |
| 5,123,153 | A | | 6/1992 | Krauss | |
| 5,957,091 | A | | 9/1999 | McDonald et al. | |
| 6,804,830 | B2 | | 10/2004 | Reynolds et al. | |
| 2007/0226962 | A2 | * | 10/2007 | Yates | 24/196 |

FOREIGN PATENT DOCUMENTS

DE 20307576 U1 7/2003
JP 10165204 A 6/1998

* cited by examiner

*Primary Examiner* — Robert J Sandy
(74) *Attorney, Agent, or Firm* — The Webb Law Firm

(57) ABSTRACT

An attaching structure for use in an attachable arrangement including at least one elongate strap and configured to be removably attached to at least a portion of a body of a user. The attaching structure includes: a frame having a first end and a second end, wherein the first end is configured for attachment of at least one strap of the attachable arrangement; and an adjustment mechanism is operational engagement with the frame, wherein at least a portion of the adjustment mechanism is configured to contact at least one strap of the attachable arrangement and permit adjustable movement thereof; and wherein the second end of the frame is elongated and configured to permit the user to grasp the second end of the frame and move it relative to the body of the user.

14 Claims, 6 Drawing Sheets

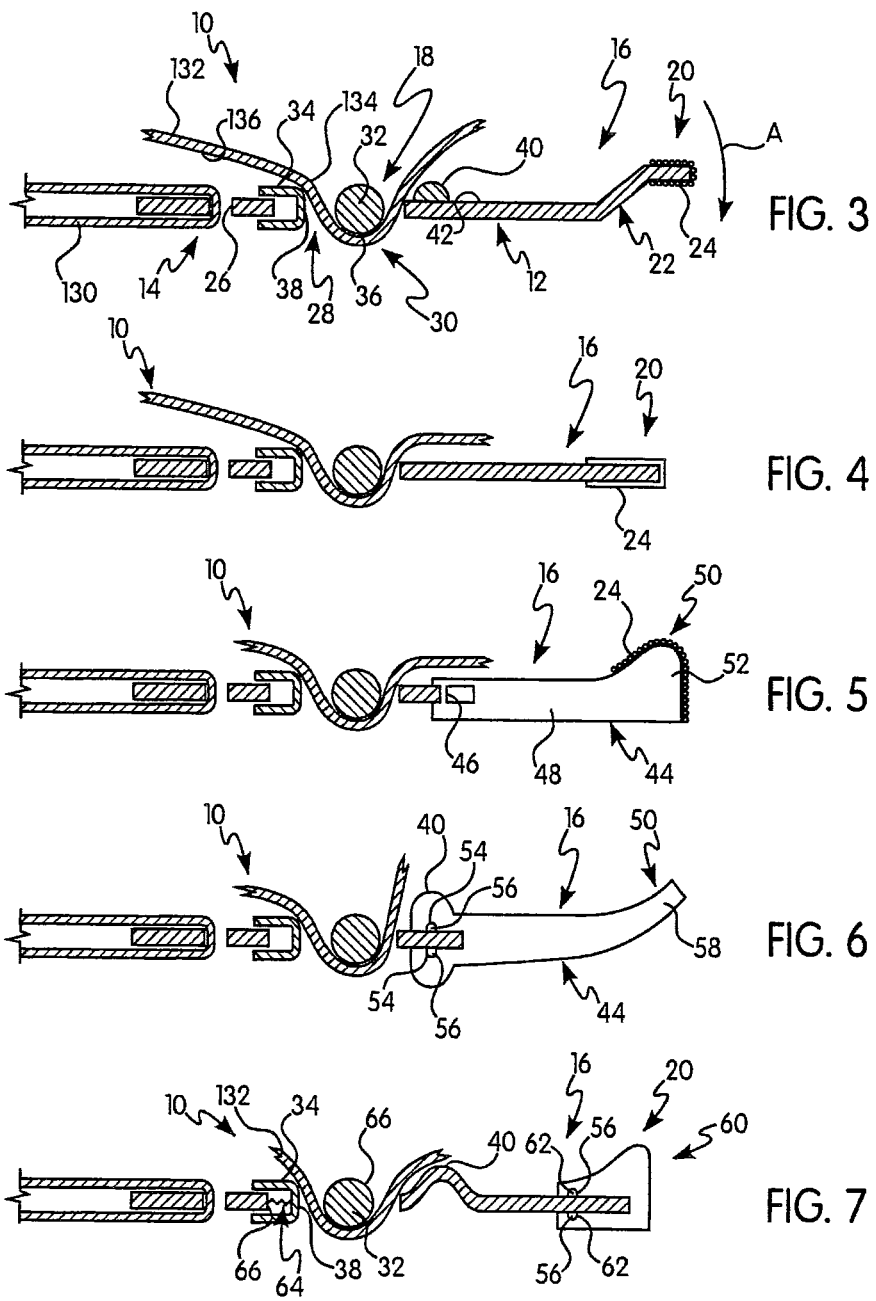

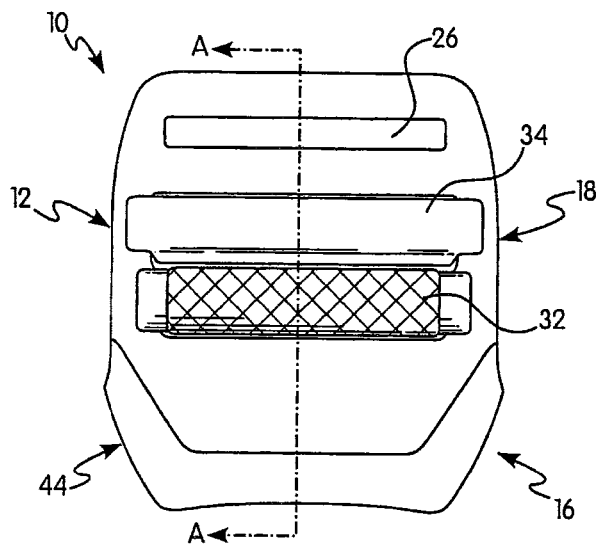
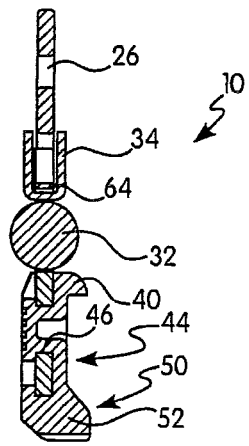
FIG. 13     FIG. 14
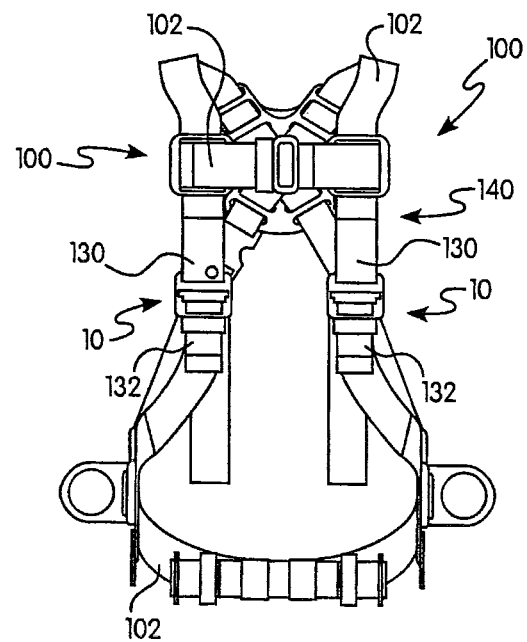
FIG. 16

ATTACHING STRUCTURE FOR AN ATTACHABLE ARRANGEMENT

CROSS REFERENCE TO RELATED APPLICATIONS

This application claims benefit of priority from U.S. Provisional Patent Application No. 61/296,221, filed Jan. 19, 2010, which is incorporated herein by reference in its entirety.

BACKGROUND OF THE INVENTION

1. Field of the Invention

The present invention relates generally to attachable arrangements, e.g., harnesses, belts, fall protection arrangements, and the like, and in particular to an attaching structure, e.g., a buckle, for use in connection with such attachable arrangements.

2. Description of the Related Art

As is known in the art, there exist various embodiments and arrangements that are attachable to a person to provide assistance to the wearer or ensure the wearer's safety in certain situations. Such attachable arrangements come in many forms, including, but not limited to, harnesses, safety belts, climbing harnesses, fall protection harnesses, safety harnesses, and fall protection arrangements. While there are many variations in such attachable arrangements, all normally include one or more elongate straps that are adjustable to fit different wearers. In operation, a person will don the attachable arrangement, attach the straps around the specified parts of his or her body, and adjust these straps to fit comfortably, yet effectively.

For example, full body harnesses are widely used for lifting and lowering individuals in dangerous situations and as a primary component in a personal fall arrest system. These harnesses can also be used for work positioning, travel restriction, ladder climbing, rescue retrieval, and evacuation. While these harnesses are used mainly in an industrial setting, and particularly the construction industry where the likelihood and danger of falls from heights is both numerous and significant, a full body harness can be used in various other applications in which total suspension and support of the body must be ensured, either expectedly or unexpectedly. Various harnesses are illustrated in U.S. Pat. Nos. 6,804,830; 5,957,091; and 4,712,513, all of which are incorporated herein by reference.

In order to appropriately don and removably attach such strap-based attachable arrangements, various attaching structures are used. For example, these attaching structures are located at specific positions on the various straps, and often allow the user to don the attachable arrangement, engage the attaching structures to secure the attachable arrangement on the user's body, and thereafter, adjust the straps (again, through one or more of the attaching structures) in order to obtain a comfortable fit. Such attaching structures include, but are not limited to, a clip, a buckle, a mating arrangement, an actuatable structure, and the like.

Many attaching structures are in the form of a frame with some mechanism operatively engaged therewith for use in manipulating one or more of the straps of the attachable arrangement. In particular, one strap is attached to a first end of the frame, and the same or another strap is adjustably and moveably engaged with the mechanism, e.g., a friction mechanism, a mechanical arrangement, or the like. In order to adjust the moveable strap, the user must grasp the frame and move it to some position, and simultaneously pull the engaged strap to tighten or loosen it. Accordingly, the frame becomes an integral part of the manipulation and strap adjustment process.

One common drawback associated with many of these existing attaching structures (as discussed above) stems from the manipulation of the frame to effectively tighten or loosen the strap engaged with the mechanism. In particular, such prior art frames are small and difficult to grasp and move, thereby leading to difficulty in adjustment. Further, and based upon the size and form of the frame of the attaching structure, when attempting to adjust the engaged strap, the user's hand often slips off of the frame. Still further, in the type of environments where such attachable arrangements are utilized, it is common that the user will be wearing gloves on his or her hands. Attempting to manipulate the frame of the attaching structure using a gloved hand proves additionally difficult, and leads to greater slippage and the inability to effectively adjust the strap.

Accordingly, there remains a need in the art of attachable arrangements, such as belts, harnesses, safety equipment, and the like, for an improved attaching structure. In particular, there remains a need for an improved attaching structure for use in connection with adjusting the straps of such an attachable arrangement. There is a further need for an attaching structure, e.g., a buckle, that provides additional gripping and manipulation characteristics for use in adjusting the straps of an attachable arrangement. There is a still further need in the art for an attaching structure that permits quick and effective manipulation and adjustment of the straps of the attachable arrangement in the field, while the user is dressed in safety equipment, e.g., gloves.

SUMMARY OF THE INVENTION

Generally, the present invention provides an attaching structure that overcomes some or all of the drawbacks and deficiencies existing in the prior art. Preferably, the present invention provides an attaching structure that leads to increased effectiveness in adjusting a strap associated with an attachable arrangement. Preferably, the present invention provides an attaching structure that provides enhanced gripping and manipulation characteristics for use in adjusting the straps of an attachable arrangement. Preferably, the present invention provides an attaching structure that permits quick and effective manipulation and adjustment of the straps of an attachable arrangement in the field.

Accordingly, and in a preferred and non-limiting embodiment of the present invention, provided is a an attaching structure for use in an attachable arrangement including at least one elongate strap and configured to be removably attached to at least a portion of a body of a user. The attaching structure includes a frame having a first end and a second end, wherein the first end is attached to at least one strap of the attachable arrangement; and an adjustment mechanism is in operational engagement with the frame. At least a portion of the adjustment mechanism is configured to contact at least one strap of the attachable arrangement and permit adjustable movement thereof. The second end of the frame is elongated and permits the user to grasp the second end of the frame and move it relative to the body of the user In another preferred and non-limiting embodiment, the present invention provides a friction buckle for use in an attachable arrangement including at least one elongate strap and configured to be removably attached to at least a portion of a body of a user. The friction buckle includes a frame having a first end and a second end, wherein the first end is configured for attachment of at least one strap of the attachable arrangement. An adjustment mechanism is in operational engagement with the frame, and at least a portion of the adjustment mechanism contacts the at least one strap of the attachable arrangement to permit adjustable movement thereof. An extension structure is attached to or integral with at least a portion of the frame, and the extension structure permits the user to grasp the friction buckle and move it relative to the body of the user.

In a further preferred and non-limiting embodiment, the present invention provides a friction buckle for use in an attachable arrangement including at least one elongate strap and configured to be removably attached to at least a portion of a body of a user. In this embodiment, the friction buckle includes: a frame having a first end and a second end and defining an opening, wherein the first end is configured for attachment of at least one strap of the attachable arrangement; and a friction mechanism in operational engagement with the opening of the frame and configured to permit adjustable movement of at least one strap of the attachable arrangement. The friction mechanism includes: (i) an adjuster bar extending across the opening and moveably engaged with the frame, wherein the adjuster bar includes a contact surface to contact a first surface of at least one strap and, in operation, permit the at least one strap to slide thereover; and (ii) a contact member extending across the opening and moveably engaged with the frame, wherein the contact member includes a contact surface to contact a second surface of the at least one strap. The second end of the frame is elongated and configured to permit the user to grasp the second end of the frame and move it relative to the body of the user.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include the plural forms unless the context clearly dictates otherwise.

BRIEF DESCRIPTION OF THE DRAWINGS

FIG. 3 is a side, sectional view of one embodiment of an attaching structure according to the principles of the present invention;

FIG. 4 is a side, sectional view of another embodiment of an attaching structure according to the principles of the present invention;

FIG. 5 is a side, sectional view of a further embodiment of an attaching structure according to the principles of the present invention;

FIG. 6 is a side, sectional view of another embodiment of an attaching structure according to the principles of the present invention;

FIG. 7 is a side, sectional view of a still further embodiment of an attaching structure according to the principles of the present invention;

FIG. 13 is a plan view of the attaching structure of FIG. 11 with an adjustment mechanism engaged therewith;

FIG. 14 is a side, sectional view of the attaching structure of FIG. 13;

FIG. 16 is a front view of an attaching structure according to the principles of the present invention as engaged with straps of an attachable arrangement according to the prior art.

DETAILED DESCRIPTION OF THE PREFERRED EMBODIMENTS

Figure 1:
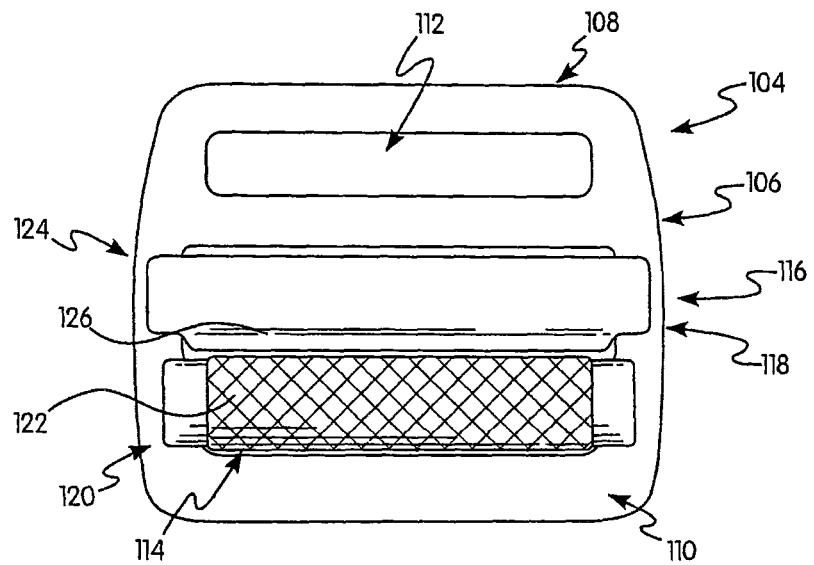
FIG. 1 is a plan view of a buckle according to the prior art.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to an attaching structure 10 for use in connection with an attachable arrangement 100, which includes at least one, and typically many, elongate straps 102 (see, e.g., FIG. 16). Various preferred and non-limiting embodiments of this attaching structure 10 are illustrated in FIGS. 3-16. The present invention is useful in connection with a variety of attachable arrangements 100, including, but not limited to, harnesses, climbing harnesses, safety harnesses, fall protection arrangements, safety belts, and the like.

In addition, the presently-invented attaching structure 10 can be configured for use in connection with existing attachable arrangements 100, i.e., as a retrofit component or device, or installed and used during the manufacturing of the attachable arrangement 100, i.e., prior to sale or use by a distributor or end user. While specifically discussed in connection with a full body harness having multiple straps 102, the attaching structure 10 of the present invention is useful in connection with any strap-based attachable arrangement 100 that has straps 102 that require some adjustment after donning the attachable arrangement 100. Still further, the attachable arrangement 100 may use multiple attaching structures 10 according to the present invention located at various positions on or over the attachable arrangement 100 (e.g., FIG. 16).

Still further, the presently-invented attaching structure 10 may be in the form of a clip, a buckle, an attaching structure, a mating arrangement, and the like. In a preferred embodiment, the present invention is directed to an attaching structure 10 in the form of a buckle having an adjustment mechanism associated therewith. In another preferred and non-limiting embodiment, this buckle is a friction buckle, i.e., the adjustment mechanism includes one or more components that permit frictional adjustment of the straps 102 of the attachable arrangement 100 that are associated with the attaching structure 10.

Figure 2:
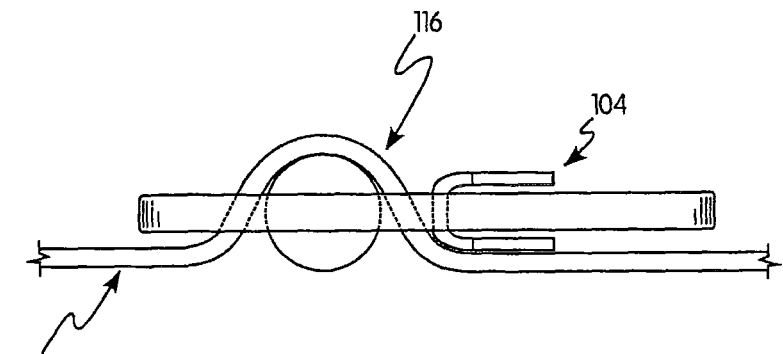
FIG. 2 is a side view of the buckle of FIG. 1 in use with a strap of an attachable arrangement.

According to the prior art, and with reference to FIGS. 1 and 2, certain attaching structures 104 are available and utilized in connection with existing attachable arrangements 100. In particular, and as illustrated in FIG. 1, such an attaching structure 104 includes a frame 106 with a first end 108 and a second end 110. A slot 112 is provided at or near the first end 108 of the frame 106, and a strap 102 is attached to the frame 106 by looping the strap 102 through the slot 112. As is known, the attachment between the strap 102 and the slot 112 is substantially permanent, i.e., the strap 102 is stitched together after forming the loop around and through the slot 112. In the middle of the frame 106 is an opening 114, and an adjustment mechanism 116 is operatively engaged with this opening 114.

While there are different types of adjustment mechanisms 116 that can be used in connection with such attaching structures 104, one common adjustment mechanism 116 is a friction mechanism 118. This friction mechanism 118 includes an adjustor bar 120 extending across the opening 114 and movably engaged with the frame 106. In particular, the adjustor bar 120 slides back and forth laterally on the frame 106. This adjustor bar 120 includes a contact surface 122 for contacting a surface of a strap 102. In operation, the strap 102 slides over the contact surface 122 of the adjustor bar 120.

Still further, the adjustment mechanism 116 includes a contact member 124 extending across the opening 114. This contact member 124, like the adjustor bar 120, is movably engaged with the frame 106, and slides back and forth laterally on the frame 106, preferably away from and towards the adjustor bar 120. Further, the contact member 124 includes a contact surface 126 for contacting an opposing surface of the strap 102.

With reference to FIG. 2, the strap 102 is fed between the adjustor bar 120 and the contact member 124, and extends through the opening 114 on the other side of the adjustor bar 120. As best seen in FIG. 2, the strap 102 is gripped between the contact surface 122 of the adjustor bar 120 and the contact surface 126 of the contact member 124 when the strap is oriented in the position illustrated in this figure. In order to adjust and release the strap 102, the second end 110 of the attaching structure 104 must be lifted, thus creating a different exit angle and permitting the strap 102 to move through the space between the adjustor bar 120 and the contact member 124 and out the opening 114. In this manner, the strap 102 of the attachable arrangement 100 is moveably adjusted by the user in either direction. It is also envisioned that the contact member 124 is urged towards the adjustor bar 120 in order to enhance the friction gripping characteristics of the adjustment mechanism 116.

As discussed above, the present invention relates to an improved attaching structure 10 for use in connection with the straps 102 of an attachable arrangement 100. One preferred and non-limiting embodiment of the attaching structure 10 is illustrated in FIG. 3. In particular, the attaching structure 10 includes a frame 12 having a first end 14 and a second end 16. The first end 14 is configured or adapted for attachment of a strap 130 of the attachable arrangement 100. An adjustment mechanism 18 is in operational engagement with the frame 12. Further, at least a portion of the adjustment mechanism 18 is configured or adapted to contact a strap 132 of the attachable arrangement 100 and permit adjustable movement thereof. Further, the second end 16 of the frame 12 is elongated, extended, or in the form of some extension structure to thereby permit the user to grasp the second end 16 of the frame 12 and move it relative to the user's body. It is this movement of the second end 16 of the frame 12 that allows for the improved manipulation of the attaching structure 10 and adjustment of the strap 132 of the attachable arrangement 100. This extension or elongate structure may be formed as part of the frame 12, attached to the frame 12, or otherwise function to provide an elongated or extended surface that can be gripped by the user.

As illustrated in the preferred and non-limiting embodiment of FIG. 3, the second end 16 of the frame 12 includes a distal portion 20, and at least a portion of this distal portion 20 is in the form of a tab 22. The shape and orientation of the tab 22 provides additional and enhanced grasping characteristics to the user of the attachable arrangement 100, thus leading to easier adjustment of the straps 102, i.e., strap 132. Of course, it is envisioned that at least a portion of the distal portion 20 may be in the form of a lip, a rib, a projection, an extension, or the like. Still further, at least a portion of the second, elongated end 16 of the frame 12 may be coated, roughened, textured, contoured, shaped, flexible, or the like. In the embodiment of FIG. 3, a portion of the distal portion 20 of the second end 16 of the frame 12 is textured, thereby creating an enhanced and functional gripping surface 24.

As also illustrated in the embodiment of FIG. 3, a slot 26 is provided on the first end 14 of the frame 12. The strap 130 extends through and is looped around the frame 12 through the slot 26. Again, this strap 130 is typically substantially permanently attached to the frame 12 through the slot 26 by stitching opposing surfaces of the strap 130. In this manner, the strap 130 remains permanently and statically attached to the frame 12 at the first end 14. In this embodiment, the frame 12 includes an opening 28 in a central area 30 of the frame 12, and the adjustment mechanism 18 is operatively engaged with the opening 28. Specifically, the strap 132 is frictionally engaged with the adjustment mechanism 18 in order to permit adjustable movement of the strap 132.

In the illustrated embodiment of FIG. 3, the strap 132 extends between an adjustor bar 32 and a contact member 34. The adjustor bar 32 extends across the opening 28 and is laterally movable with respect to the frame 12. Further, the adjustor bar 32 includes a contact surface 36 for contacting a first surface 134 of the strap 132. Specifically, and in operation, the first surface 134 of the strap 132 slides over the contact surface 36 of the adjustor bar 32.

Further, in this embodiment, the contact member 34 extends across the opening 28 and is also laterally movable with respect to the frame 12, preferably moveable towards and away from the adjustor bar 32. The contact member 34 also includes a contact surface 38 for contacting a second surface 136 of the strap 132. It is the interaction between the movable adjustor bar 32 and moveable contact member 34 that permits the strap 132 to move relative to the frame 12, and be adjusted when the frame 12 of the attaching structure 10 is oriented in an appropriate direction (as indicated by arrow A). When the frame 12 is released or untouched, the strap 132 is frictionally gripped and firmly held between the adjustor bar 32 and contact member 34. In this manner, the strap 132 can be adjusted by the user after donning the attachable arrangement 100, and when released, hold the strap 132 in place in order to achieve the intended purpose of the attachable arrangement 100, i.e., providing safety in specific environments and under certain conditions.

As also shown in FIG. 3, and with respect to the illustrated preferred and non-limiting embodiment, a rib 40 may extend at least partially across a surface 42 of the frame 12 in an area substantially adjacent the opening 28. By using such a rib 40, the exit angle of the strap 132 from the opening is enhanced. While the user will still lift the second end 16 of the frame 12 in order to adjust the strap 132, the use of this rib 40 permits easier adjustment, and often will allow the user to use only one hand in order to adjust the strap 132. For example, the user may tighten the strap 132 by simply pulling down on the strap 132 with one hand. The strap 132 may be loosened in a similar manner Accordingly, by changing the exit angle of the strap 132 via the rib 40, the attachable arrangement 100 is more easily donned and adjusted to the specific user.

A further preferred and non-limiting embodiment of the attaching structure 10 of the present invention is illustrated in FIG. 4. As discussed above, at least a portion of the second, elongated end 16 may be coated, roughened, textured, contoured, shaped, flexible, or the like. Similarly, at least a portion of this second, elongated end 16 may be manufactured from rubber, a synthetic material, a flexible material, a coated material, a roughened material, a textured material, a contoured material, or the like. In the illustrated embodiment, a portion of the second, elongated end 16 is coated with a material to thereby create the gripping surface 24. The use of such a gripping surface 24 allows a user to more easily grasp and manipulate the attaching structure, especially when the user is wearing gloves.

In a still further preferred and non-limiting embodiment, the second, elongated end 16 of the frame 12 may be formed by attaching an extension structure 44 to the frame 12, as shown in FIG. 5. Whether permanent, semi-permanent, or removably attached thereto, the extension structure 44 provides the enhanced grasping and manipulation characteristics discussed above. In this embodiment, the extension structure 44 is permanently attached to the frame 12 by forming or molding the extension structure 44 over and to the frame 12. The attachment is achieved by allowing the extension structure 44 to be formed and attached through a slot 46 on the frame 12. However, any known formation techniques are envisioned to attach the extension structure 44 to the frame 12, e.g., over-molding, or the like.

As illustrated in FIG. 5, the extension structure 44 includes a body 48 with a distal end 50. At least a portion of this distal end 50 may include a lip, a tab, a rib, a projection, an extension, or the like. In the illustrated embodiment, a rib 52 extends at least partially across the distal end 50 of the body 48 of the extension structure 44, again for use in grasping and manipulating the frame 12 of the attaching structure 10. Further, it is envisioned that at least a portion of the extension structure 44 may be coated, roughened, textured, contoured, shaped, flexible, or the like. In addition, at least a portion of the extension structure 44 may be manufactured from rubber, a synthetic material, a flexible material, a coated material, a roughened material, a textured material, a contoured material, or the like.

A still further preferred and non-limiting embodiment of the present invention is illustrated in FIG. 6. In this embodiment, the extension structure 44 is removably attached to the frame 12. In particular, the extension structure 44 includes indents 54 that are sized and shaped so as to fit over corresponding projections 56 on the frame 12. In operation, the extension structure 44 is inserted over the frame 12 until the indents 54 extend over and bear against a respective and aligned projection 56. As also illustrated in this embodiment, the distal end 50 of the body 48 of the extension structure 44 is in the form of a lip 58. As also seen in the embodiment of FIG. 6, the rib 40 is formed on the extension structure 44 for use in changing the exit angle of the strap 132 and leading to improved adjustment characteristics.

Yet another preferred and non-embodiment of the present invention is illustrated in FIG. 7. In this embodiment, the second, elongated end 16 of the frame 12 includes similar projections on the frame 12 as discussed above in connection with the embodiment of FIG. 6. However, in this embodiment, a tip 60 is removably positionable over the second, elongated end 16 of the frame 12 through the use of indents 62 that align with and bear against the projections 56. Further, this tip 60 is contoured (e.g., such as in the form of a lip) for use in providing the above-discussed gripping functionality. Of course, it is envisioned that at least a portion of the tip 60 may be coated, roughened, textured, contoured, shaped, flexible, or the like. Similarly, at least a portion of the tip 60 may be manufactured from rubber, a synthetic material, a flexible material, a coated material, a roughened material, a textured material, a contoured material, or the like. While it is illustrated that this tip 60 is removably positionable over the second, elongated end 16 of the frame 12, it is further envisioned that the tip 60 can be permanently attached thereto.

As also illustrated in the preferred and non-limiting embodiment of FIG. 7, the contact surface 36 of the adjustor bar 32 is textured to allow for enhanced gripping of the first surface 134 of the strap 132. This contact surface 36 (and/or the contact surface 38 of the contact member 34) may be coated, roughened, textured, contoured, shaped, flexible, or the like, in order to provide for effective frictional engagement with the strap 132.

In the embodiment of FIG. 7, the adjustment mechanism 18 includes an urging structure 64 (e.g., a spring) that is positioned between a surface 66 of the frame 12 and the contact member 34. The urging structure 64 urges the contact surface 38 of the contact member 34 towards and against the second surface 136 of the strap 132. While not necessary, the use of such an urging structure 64 also assists in frictionally engaging the strap 132 between the contact member 34 and the adjustor bar 32. In addition, in the illustrated embodiment, the rib 40 is used for changing the exit angle of the strap 132.

Figure 8:
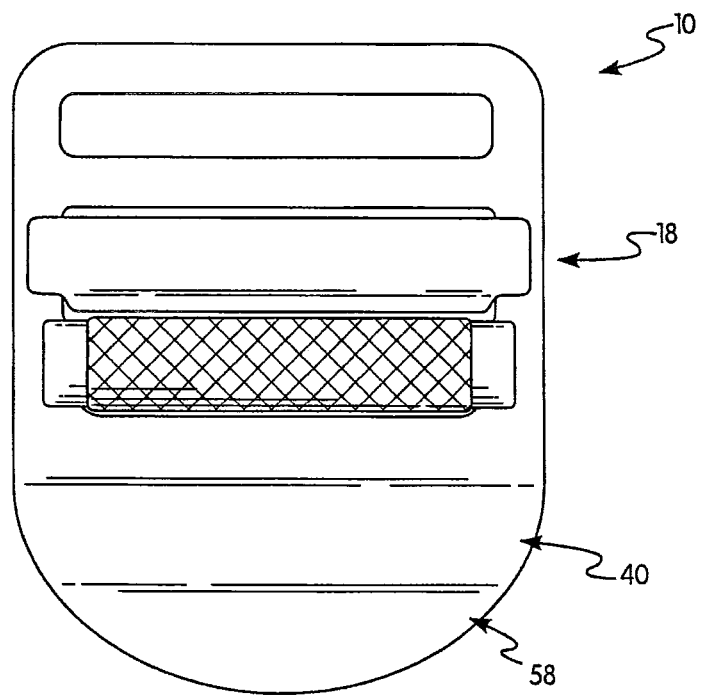
FIG. 8 is a plan view of a further embodiment of an attaching structure according to the principles of the present invention.
Figure 9:
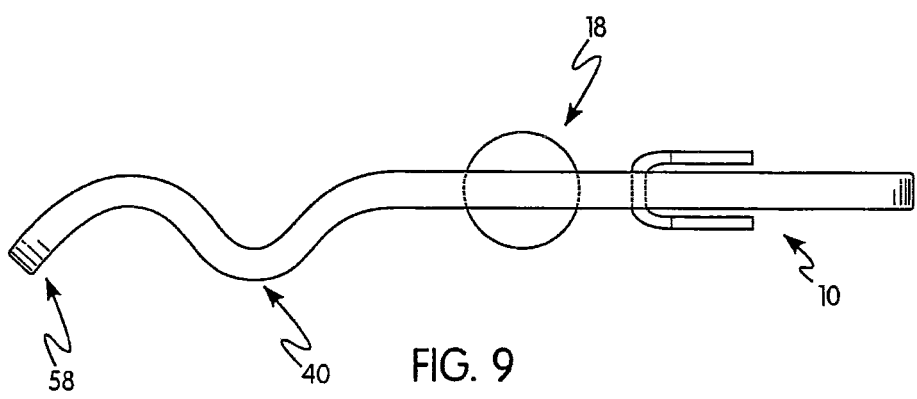
FIG. 9 is a side view of the attaching structure of FIG. 8.
Figure 10:
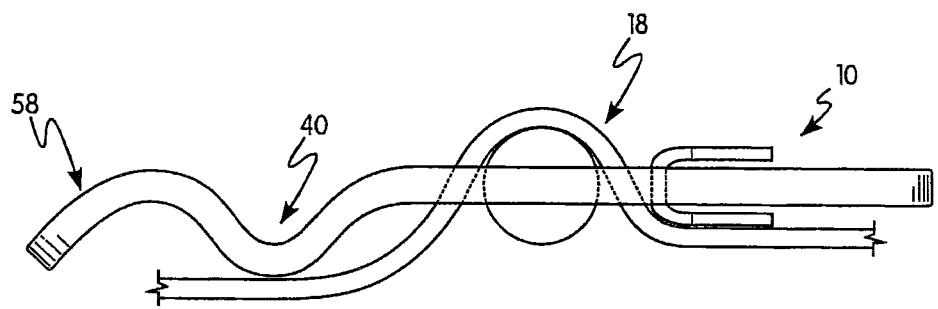
FIG. 10 is a side view of the attaching structure of FIG. 8 in use with a strap of an attachable arrangement.
Figures 11, 12:
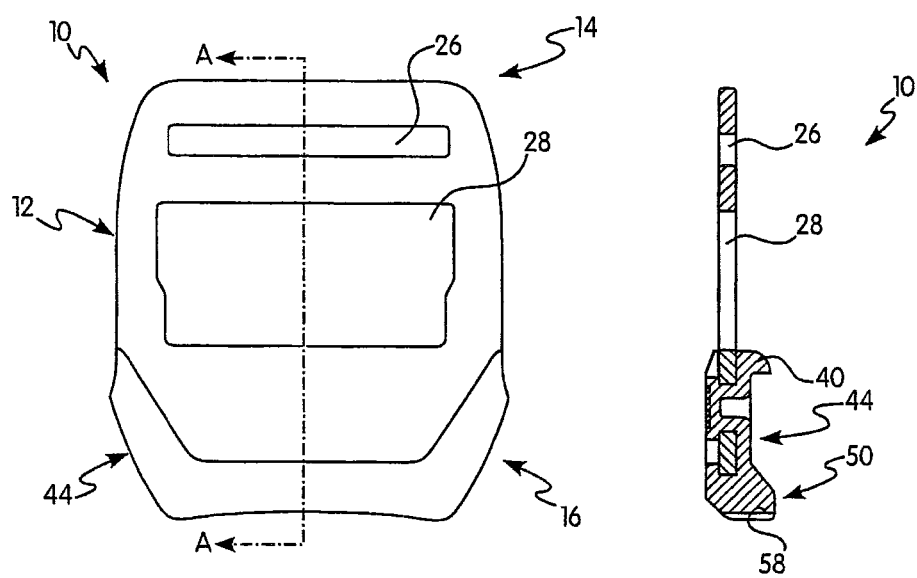
FIG. 11 is a plan view of another embodiment of a portion of an attaching structure according to the principles of the present invention.
FIG. 12 is a side, sectional view of the attaching structure of FIG. 11.
Figure 15:
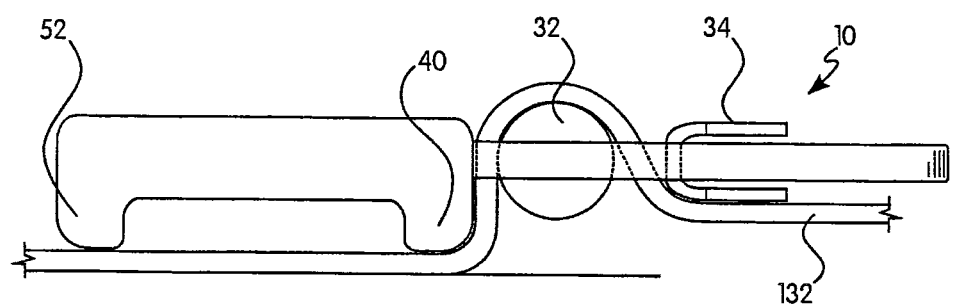
FIG. 15 is a side view of a still further embodiment of an attaching structure according to the principles of the present invention, and in use with a strap of an attachable arrangement.

Further embodiments of the attaching structure 10 in accordance with the present invention are illustrated in FIGS. 8-15. In particular, and as shown in FIGS. 8-10, the frame 12 of the attaching structure 10 may be in the form of a stamped, metallic component. In this embodiment, the frame 12 includes the rib 40 and a lip 58 at the distal portion 20 of the second, elongated end 16 of the frame 12.

The embodiments of FIGS. 11-15 include the frame 12 with an extension structure 44 that is molded over the frame 12 engaged with a slot 46 in the frame 12. Further, the embodiments of FIGS. 11-15 also include the rib 40 for modifying the exit angle of the strap 132, as well as the rib 52 at the distal end 50 of the extension structure 44. By not manufacturing a portion of the frame 12, i.e., the second, elongated end 16, of the attaching structure 10 from a metal material (as in the embodiment of FIGS. 8-10), the use of an over-molded extension structure 44 (as the second, elongated end 16) reduces the weight of the overall attaching structure 10, and leads to additional ergonomic benefits and features.

As discussed above, the attaching structure 10 of the present invention may be used in connection with a variety of attachable arrangements 100. As illustrated in FIG. 16, multiple attaching structures 10 may be used in connection with the straps 102 of a harness 140. Of course, the attaching structures 10 may be used in connection with any type of attachable arrangement 100 where the straps 102 should be adjustable to fit different sizes of users. In this manner, the present invention provides an attaching structure 10 that leads to increased effectiveness in adjusting a strap 102 associated with the attachable arrangement 100, such as by one hand. The attaching structure 10 allows for enhanced gripping and manipulation functionality for adjusting the straps 102, thus leading to quick and effective manipulation and adjustment of the straps 102 in the field, such as when the user is wearing gloves or the like.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An attaching structure for use in an attachable arrangement comprising at least one elongate strap and configured to be removably attached to at least a portion of a body of a user, the attaching structure comprising:
    a frame having a first end and a second end, wherein the first end is configured for attachment of at least one strap of the attachable arrangement; and
    an adjustment mechanism in operational engagement with the frame, wherein at least a portion of the adjustment mechanism is configured to contact at least one strap of the attachable arrangement and permit adjustable movement thereof;
    wherein the second end of the frame is elongated and configured to permit the user to grasp the second end of the frame and move it relative to the body of the user, and wherein the second end has a removably attachable extension structure,
    wherein the frame defines an opening and the adjustment mechanism is in operative engagement with the opening, and wherein a rib extends at least partially across at least one surface of the frame in an area substantially adjacent the opening to change the exit angle of the strap in order to facilitate operation of the attaching structure.

2. The attaching structure of claim 1, wherein at least a portion of a distal portion of the second, elongated end of the frame includes at least one of the following: a lip, a tab, a rib, a projection, an extension, or any combination thereof.

3. The attaching structure of claim 1, wherein at least a portion of the second, elongated end of the frame is at least one of the following: coated, roughened, textured, contoured, shaped, flexible, or any combination thereof.

4. The attaching structure of claim 1, wherein at least a portion of the second, elongated end of the frame is manufactured from at least one of the following: rubber, a synthetic material, a flexible material, a coated material, a roughened material, a textured material, a contoured material, or any combination thereof.

5. The attaching structure of claim 1, wherein the extension structure comprises a body with a distal end, wherein at least a portion of the distal end includes at least one of the following: a lip, a tab, a rib, a projection, an extension, or any combination thereof.

6. The attaching structure of claim 1, wherein at least a portion of the extension structure is at least one of the following: coated, roughened, textured, contoured, shaped, flexible, or any combination thereof.

7. The attaching structure of claim 1, wherein at least a portion of the extension structure is manufactured from at least one of the following: rubber, a synthetic material, a flexible material, a coated material, a roughened material, a textured material, a contoured material, or any combination thereof.

8. The attaching structure of claim 1, further comprising at least one tip positioned over a distal portion of the second, elongated end of the frame.

9. The attaching structure of claim 8, wherein the at least one tip is removably positionable over the distal portion of the second, elongated end of the frame.

10. The attaching structure of claim 1, wherein the frame defines an opening and the adjustment mechanism is in operative engagement with the opening.

11. The attaching structure of claim 10, wherein the adjustment mechanism comprises:
    an adjuster bar extending across the opening and moveably engaged with the frame, wherein the adjuster bar includes a contact surface configured to contact a first surface of at least one strap and, in operation, permit the at least one strap to slide thereover; and
    a contact member extending across the opening and moveably engaged with the frame, wherein the contact member includes a contact surface configured to contact a second surface of the at least one strap.

12. The attaching structure of claim 11, further comprising an urging structure positioned between a surface of the frame and the contact member, wherein the urging structure is configured to urge the contact surface of the contact member against the second surface of the at least one strap.

13. A friction buckle for use in an attachable arrangement comprising at least one elongate strap and configured to be removably attached to at least a portion of a body of a user, the friction buckle comprising:
    a frame having a first end and a second end, wherein the first end is configured for attachment of at least one strap of the attachable arrangement;
    an adjustment mechanism in operational engagement with the frame, wherein at least a portion of the adjustment mechanism is configured to contact at least one strap of the attachable arrangement and permit adjustable movement thereof; and
    an extension structure removably attached to the second end of the frame, wherein the extension structure permits the user to grasp the attaching structure with one hand and move it relative to the body of the user,
    wherein the frame defines an opening and the adjustment mechanism is in operative engagement with the opening, and wherein a rib extends at least partially across at least one surface of the frame in an area substantially adjacent the opening to change the exit angle of the strap in order to facilitate operation of the attaching structure.

14. A friction buckle for use in an attachable arrangement comprising at least one elongate strap and configured to be removably attached to at least a portion of a body of a user, the friction buckle comprising:
    a frame having a first end and a second end and defining an opening, wherein the first end is configured for attachment of at least one strap of the attachable arrangement; and
    a friction mechanism in operational engagement with the opening of the frame and configured to permit adjustable movement of at least one strap of the attachable arrangement, the friction mechanism comprising:
    (i) an adjuster bar extending across the opening and moveably engaged with the frame, wherein the adjuster bar includes a contact surface configured to contact a first surface of at least one strap and, in operation, permit the at least one strap to slide thereover; and (ii) a contact member extending across the opening and moveably engaged with the frame, wherein the contact member includes a contact surface configured to contact a second surface of the at least one strap;

wherein the second end of the frame is elongated and configured to permit the user to grasp the second end of the frame with one hand and move it relative to the body of the user, and wherein the second end has a removably attachable extension structure, wherein a rib extends at least partially across at least one surface of the frame in an area substantially adjacent the opening to change the exit angle of the strap in order to facilitate operation of the attaching structure.

* * * * *